3,325,207
ASSIST MECHANISM FOR CARGO LIDS
Woodrow M. Anderson, Wayne, and Barry N. Kleppin, Ann Arbor, Mich., assignors to Chrysler Corporation, Highland Park, Mich., a corporation of Delaware
Filed Oct. 23, 1964, Ser. No. 406,051
9 Claims. (Cl. 296—37)

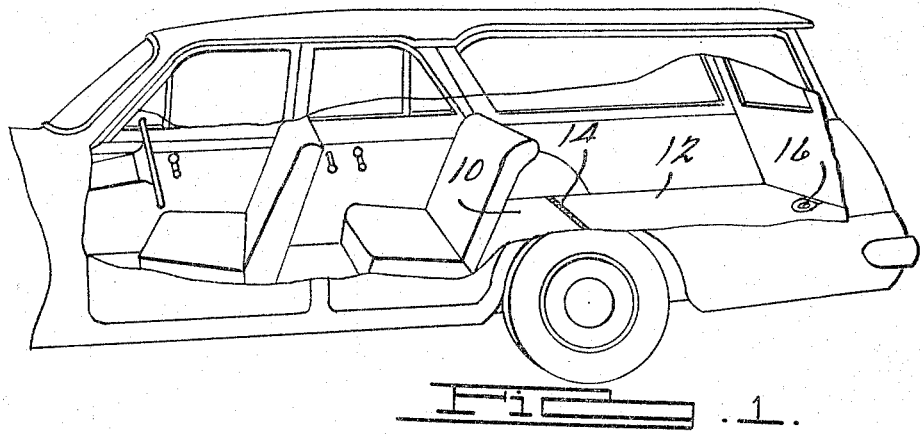
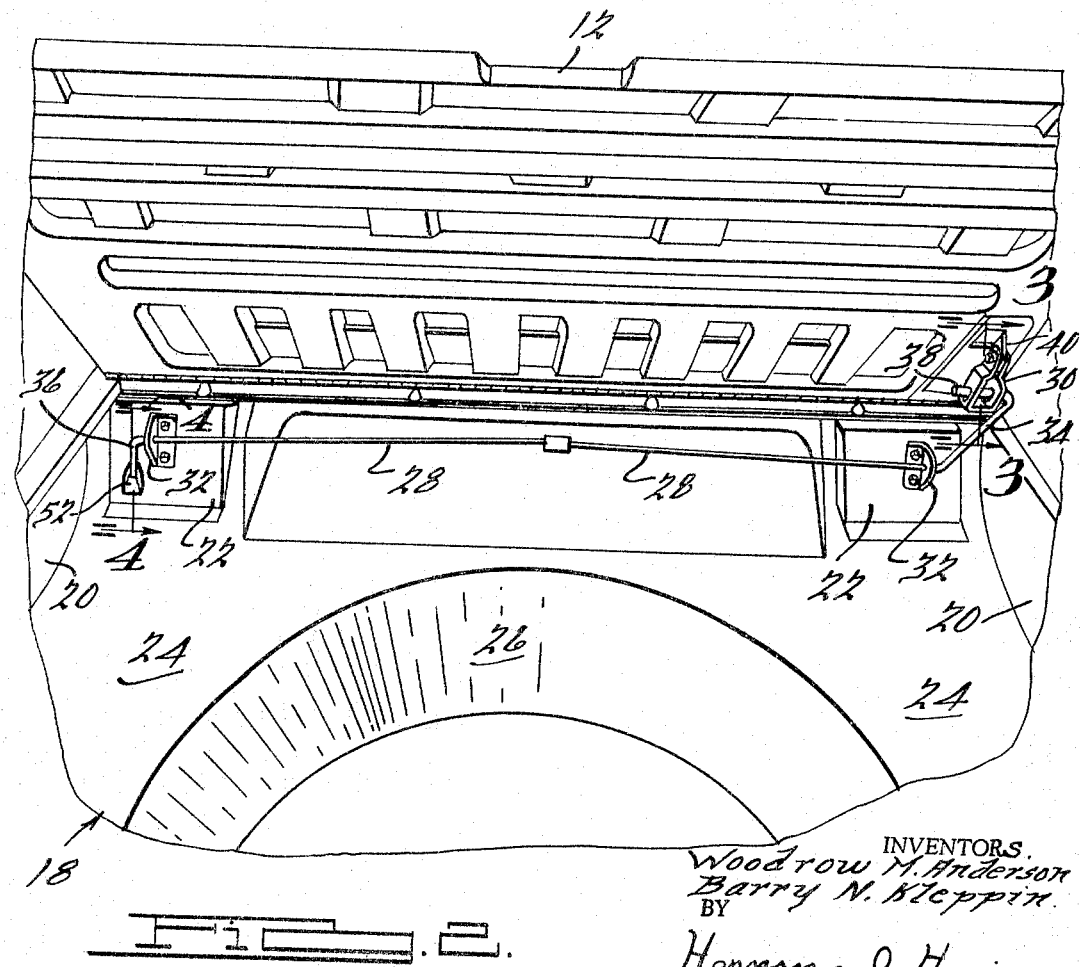

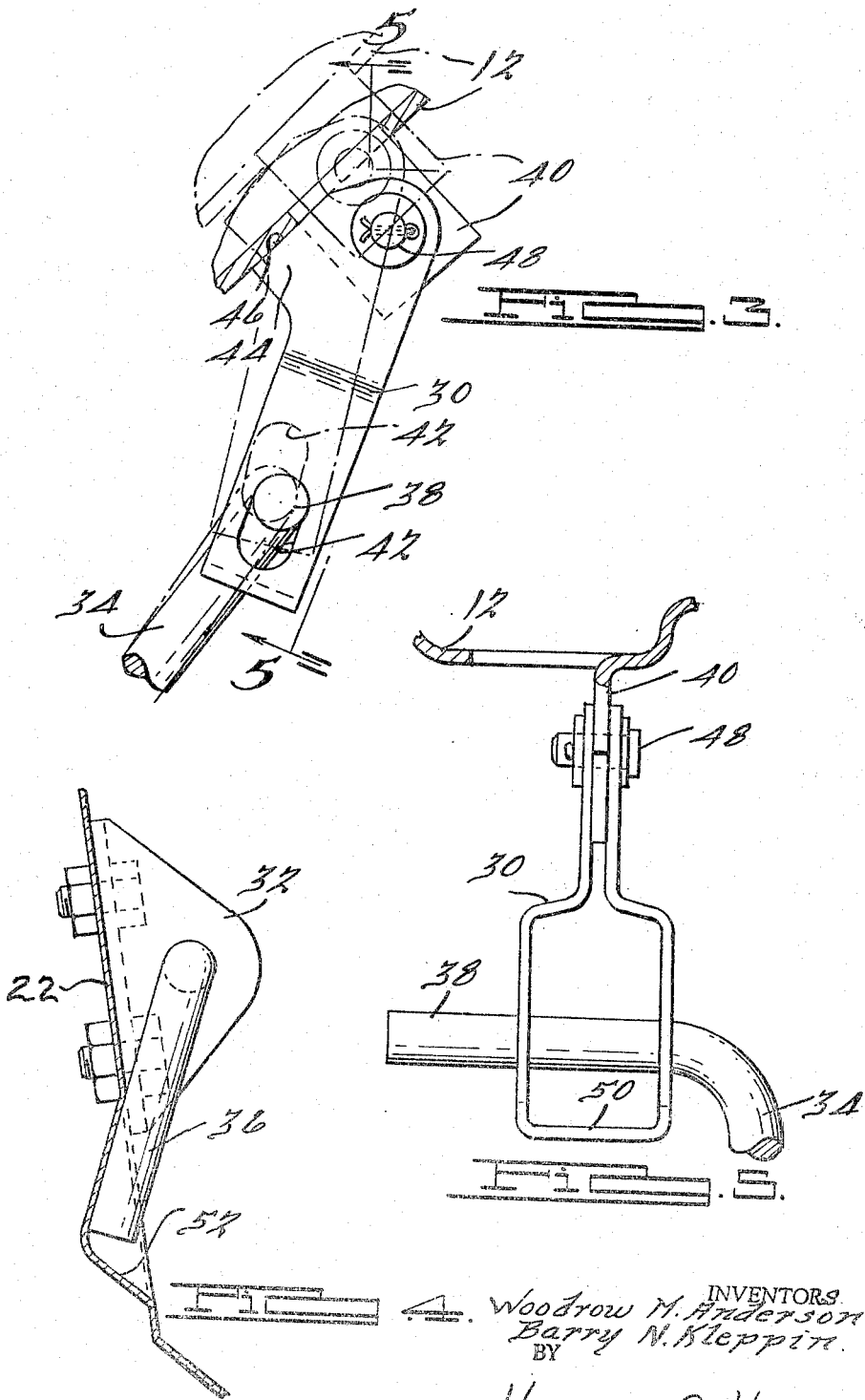

This invention relates to assist mechanisms for cargo compartment lids; more particularly, it relates to an assist mechanism for the pivotal floor section overlying the hidden cargo compartment in a suburban type motor vehicle.

It is an object of the present invention to provide an improved assist mechanism for cargo lids.

It is a more specific object to provide an assist mechanism for the pivoted cargo floor section in a suburban type motor vehicle.

It is a further object to provide an assist mechanism as aforesaid which will be inexpensive, reliable and effective in operation, and compact.

A further object is to provide an assist mechanism for a cargo lid which will assist movement of the cargo lid to a predetermined open position and yet allow further manual opening movement of the lid to improve access to the cargo compartment.

These and other objects, features and advantages of the invention will become apparent from the following detailed description of a preferred embodiment of the invention and by reference to the accompanying drawings in which:

FIGURE 1 is a fragmentary perspective view of a suburban type motor vehicle having a hinged cargo floor section providing access to an underlying cargo compartment;

FIGURE 2 is a fragmentary perspective view, on an enlarged scale, looking in from the rear of the vehicle of FIGURE 1 and showing a mechanism to assist the opening movement of the cargo floor section;

FIGURES 3 and 4 are sectional fragmentary views taken on lines 3—3 and 4—4, respectively, of FIGURE 2; and FIGURE 5 is a sectional fragmentary view taken on line 5—5 of FIGURE 3.

The motor vehicle shown in FIGURE 1 is of a suburban or station wagon type and includes a rear cargo floor 10 having a floor section 12 provided at its forward edge with a suitable hinge 14 and held in its down or closed position by a suitable latch 16 engaging its rear edge.

Referring now to FIGURE 2, floor section 12 overlies, and provides access to, a hidden cargo storage area indicated generally at 18. Area 18 is of known configuration and includes longitudinal side walls 20, a forward transverse side wall 22, a floor 24 provided with a well 26, and a rear transverse side wall (not shown).

This invention concerns primarily a novel mechanism to assist in the opening pivotal movement of the relatively heavy floor section 12.

This assist mechanism of the invention comprises, broadly, a torsion rod 28 and a link 30. Rod 28 is pivotally mounted in a position rearwardly of and parallel to wall 22, and below and parallel to hinge 14, by a pair of lugs 32 secured to wall 22 at transversely spaced locations thereon. Rod 28 is cranked at each end to provide first and second (or right and left as viewed in FIGURE 2) crank arms 34 and 36.

Crank arm 34 is in turn cranked at its free end to provide a stub rod 38 extending substantially parallel to the main body portion of rod 28.

Referring now to FIGURE 3, link 30 is pivotally secured at its upper end to a lug 40 struck downwardly from floor section 12. At its lower end, link 30 has a longitudinal slot 42 slidably receiving the stub rod 38. Link 30 also includes an offset portion 44 presenting a flat surface 46 for coaction, in a manner to be hereinafter described, with the undersurface of floor section 12.

As best seen in FIGURE 5, link 30 actually comprises a strip of metallic material doubled over with the ends of the strip straddling lug 40 and passing a pivot pin 48. A bridge portion 50 separates the opposite sides of the strip adjacent the lower end of the link to provide rigidity. Slot 42 actually comprises a pair of aligned slots in the opposite strip sides and each strip side also includes an offset portion 44 and flat surface 46 as aforesaid.

Crank 36 occupies an angular position relative to crank arm 34 such that it is pressed against wall 22 by the weight of floor section 12 acting through crank arm 36 and rod 28. A depression 52 (FIGURE 4) is provided in wall 22 to receive the free end of arm 36.

When the floor section is pivoted downwardly from its open position of FIGURE 2, rod 28 is twisted between its ends because of the anchoring of arm 36 against wall 22. When in the fully closed position of FIGURE 1, latch 16 maintains floor section 12 in its closed position against the urging of the twisted rod 28 and stub rod 38 is pressed upwardly against the upper end of slot 42.

When latch 16 is released, rod 28 untwists to drive floor section 12 upwardly, through arm 34 and link 30, toward its open position.

The dimensions and specifications of the various components are preferably selected such that, with the floor section in its closed position, the counterclockwise or upward moment exerted about the axis of hinge 14 by the twisted rod 28 exceeds the clockwise or downward moment exerted about this axis by the weight of floor section 12. The floor section will thus pop up upon release of the latch and move toward its fully open position.

Preferably, the various components are designed such that the counterclockwise moment exerted by the rod 28, which, of course, decreases as the rod untwists, will equal the clockwise moment due to the weight of the floor section after the floor section has passed through a few degrees of opening movement. The floor section will thus dwell in this partially open position, whereafter a slight manual assist will carry it to a further open position.

Desirably, when the section reaches this further open position, the rapidly increasing mechanical advantage of the torsion bar (i.e., the ratio of the distance from the axis of the torsion rod to the line of action of the force applied to the floor section, to the distance from the axis of hinge 14 to that line of action) more than compensates for the steadily but relatively slowly decreasing torque available from the rod so that the rod once more takes over and moves the floor section briskly to its fully open position without further manual assist.

The fully open position is established by the coaction of surfaces 46 on link 35 with the adjacent undersurface of floor section 12. The meeting of surfaces 46 with the underside of the floor section effectively locks the link 30 to exhaust the ability of the rod 28 to raise the section. In this fully open position, and as best seen in FIGURE 3, the stud rod 38 continues to press against the upper end of slot 42.

The lid may be manually opened beyond this position by virtue of the slot 42 which allows floor section 12 to be moved relative to torsion rod 28. That is, with the floor section in its fully opened or full line position of FIGURE 3, it may be manually moved to its dotted line position of that figure, this additional opening movement being accompanied, and made possible, by sliding movement of stub rod 38 from the upper to the lower end of slot 42.

The present invention will thus be seen to provide a simple, inexpensive and compact assist mechanism for the hinged cargo floor section of a suburban type vehicle; the invention also provides a cargo lid assist mechanism that assists in the movement of the lid to a predetermined, fully, open position and which yet allows further manual opening of the lid to improve access to the cargo compartment.

While a preferred embodiment of the invention has been illustrated and described in detail, it is to be understood various changes may be made in the preferred embodiment without departing from the scope or spirit of the invention as defined by the appended claims.

We claim:
1. In a motor vehicle having a cargo compartment:
   (A) a lid hinged adjacent one end for pivotal movement between a closed position sealing said compartment and an open position allowing access thereto;
   (B) a latch engaging the free end of said lid to hold it in its closed position;
   (C) a spring member arranged to
      (1) store energy in response to movement of said lid to its closed position, and
      (2) release said energy upon release of said latch to move said lid toward said open position; and
   (D) a link member pivotally connected at one end to said spring member and at its other end pivotally connected to said lid and allowing pivotal movement of said lid relative to said spring member, whereby said lid may be moved manually beyond said open position to improve access to said compartment.

2. In a motor vehicle having a cargo compartment:
   (A) a lid hinged adjacent one end for pivotal movement between a closed position sealing said compartment and an opened position allowing access thereto;
   (B) a latch engaging the free end of said lid to hold it in its closed position;
   (C) a torsion bar extending parallel to the hinge of said lid and including a crank arm; and
   (D) a link
      (1) pivotally secured to said lid at a location thereon spaced from said hinge, and
      (2) having a closed ended slot receiving the end of said crank arm and being of a length to allow sliding movement of said crank arm end therein.

3. In a motor vehicle having a cargo compartment:
   (A) a lid hinged adjacent one end for pivotal movement between a closed position sealing said compartment and an open position allowing access thereto;
   (B) a latch engaging the free end of said lid to hold it in its closed position;
   (C) a torsion bar extending beneath, and parallel to, the hinge on said lid and including a crank arm;
   (D) a link
      (1) pivotally secured at its upper end to the underside of said lid at a location thereon spaced from said hinge, and
      (2) having a closed ended longitudinal slot adjacent its lower end receiving the free end of said crank arm and being of a length to allow sliding movement of said crank arm end therein; and
   (E) means anchoring at least one end of said bar in an angular position such that the bar is twisted between that end and said crank arm upon closing of said lid to press the free end of said crank arm against the upper end of said slot, whereby upon release of said latch said bar unwinds to drive said lid upwardly and, with said lid in its open position, said lid may be manually further opened by sliding movement of said crank arm from the upper to the lower end of said slot.

4. In a motor vehicle of the suburban type having a rear cargo floor including a hinged floor section pivotal upwardly to provide access to a cargo compartment located below that section:
   (A) a torsion bar extending beneath the level of said floor and parallel to the hinge on said floor section and including a crank arm;
   (B) means pivotally connecting the end of said crank arm to the underside of said lid at a location thereon spaced from said hinge;
   (C) a latch engaging the end of said floor section remote from said hinge to hold said section in its closed position; and
   (D) means anchoring at least one end of said bar in an angular position such that the bar is twisted between that end and said crank arm upon closing of said lid and unwinds upon release of said latch to assist in the opening movement of the lid.

5. In a motor vehicle of the suburban type having a rear cargo floor including a hinged floor section pivotal upwardly to provide access to a cargo compartment located below that section and having a side wall parallel to the hinge on said floor section:
   (A) a torsion bar extending beneath the level of said floor and parallel to said hinge and including first and second crank arms;
   (B) means pivotally connecting the end of said first crank arm to the underside of said floor section at a location thereon spaced from said hinge;
   (C) a latch engaging the end of the floor section remote from said hinge to hold said section in its closed position;
   (D) the relative angular positions of said crank arms being such that said second crank arm bears against said side wall with said lid in its open position so that said bar is twisted between said crank arms upon closing of said lid.

6. In a motor vehicle of the suburban type having a rear cargo floor including a hinged floor section pivotal upwardly to provide access to a cargo compartment located below that section:
   (A) a torsion bar extending beneath the level of said floor and parallel to the hinge on said floor section and including a crank arm;
   (B) a link
      (1) pivotally connected at its upper end to the underside of said floor section at a location thereon spaced from said hinge, and
      (2) pivotally connected at its lower end to the free end of said crank arm;
   (C) a latch engaging the end of said floor section remote from said hinge to hold said section in its closed position; and
   (D) means anchoring at least one end of said bar in an angular position such that the bar is twisted between that end and said crank arm upon closing of said lid, whereby said bar unwinds upon release of said latch to assist in the movement of the lid to its open position.

7. A motor vehicle according to claim 6 wherein said link includes a stop portion adjacent its upper end for coaction with the underside of said lid upon pivotal movement of the latter to establish the open position of said lid.

8. In a motor vehicle of the suburban type having a rear cargo floor including a hinged floor section pivotal upwardly to provide access to a cargo compartment located below that section:
   (A) a torsion bar extending beneath the level of said floor and parallel to the hinge on said floor section and including a crank arm;
   (B) a link
      (1) pivotally connected at its upper end to the underside of said lid at a location thereon spaced from said hinge, and (2) having a closed ended longitudinal slot adjacent its lower end receiving the free end of said crank arm and being of a length to allow sliding movement of said crank arm end therein;
(C) a latch engaging the end of said floor section remote from said hinge to hold said floor section in its closed position;
(D) means anchoring at least one end of said bar in an angular position such that the bar is twisted between that end and said crank arm upon closing of said lid, whereby said bar unwinds upon release of said latch to assist in movement of the lid to its open position, whereafter the lid may be further opened manually by sliding movement of said crank arm end in said slot.

9. A motor vehicle of the suburban type having a rear cargo floor including a hinged floor section pivotal upwardly to provide access to a cargo compartment located below that section and having a side wall parallel to the hinge on said floor section:
(A) a torsion bar extending beneath the level of said floor parallel to said side wall and including a crank arm at each end;
(B) a link
  (1) pivotally connected at its upper end to the underside of said floor section at a location thereon spaced from said hinge;
  (2) having a closed ended slot adjacent its lower end receiving the end of the crank arm at one end of said bar and being of a length to allow sliding movement of said crank arm therein, and
  (3) including a stop portion adjacent its upper end for coaction with the underside of said floor section upon pivotal opening movement of the latter to establish the open position of said floor section; and
(C) a latch engaging the end of said floor section remote from said hinge to hold said section in its closed position;
(D) the relative angular positions of said crank arms being such that the crank arm at the other end of said bar bears against said side wall with the lid in its open position so that the bar is twisted between its ends upon closing of said lid, whereby the bar unwinds upon release of said latch to assist in the movement of the lid to its open position whereafter the lid may be further opened manually by sliding movement of said crank arm end in said slot.

References Cited

UNITED STATES PATENTS

| | | | |
|---|---|---|---|
| 1,247,687 | 11/1917 | Just | 16—80 |
| 2,075,449 | 3/1937 | McMahon | 296—24 |
| 2,602,957 | 7/1952 | Anderson | 16—180 X |
| 2,871,505 | 2/1959 | Clark et al. | 296—76 X |

BENJAMIN HERSH, *Primary Examiner.*

J. A. PEKAR, *Assistant Examiner.*